J. P., F. E., & O. E. LORD.
Mowing-Machine.
No. 161,136. Patented March 23, 1875.
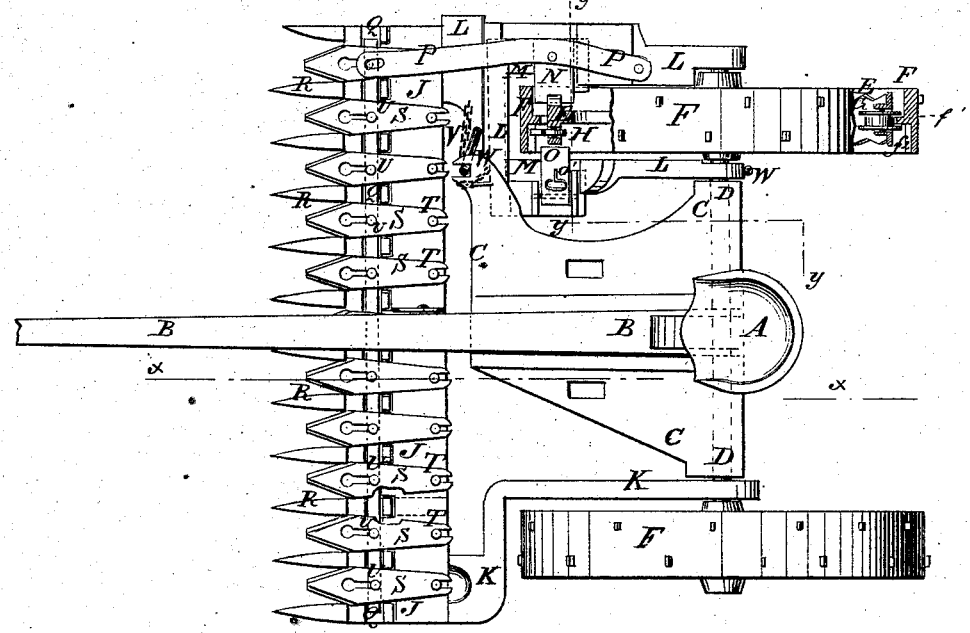
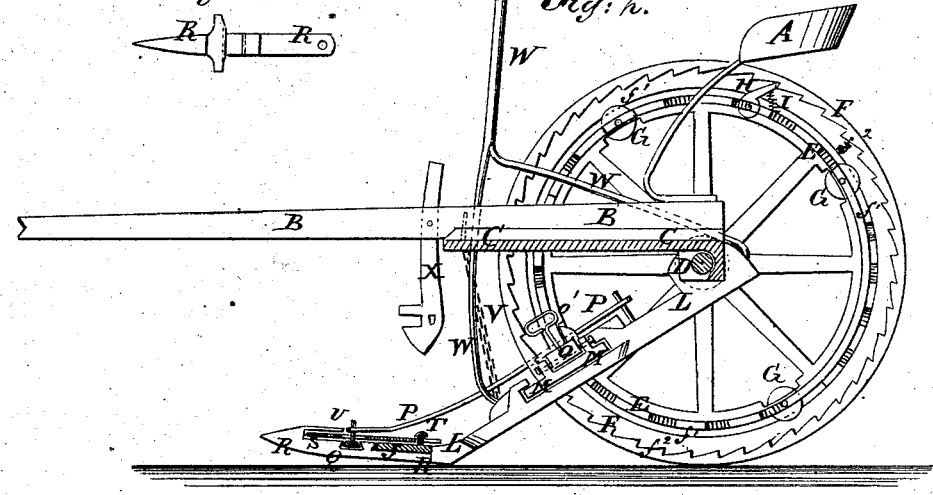
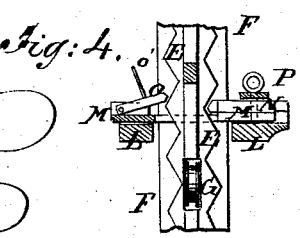
WITNESSES:
Chas. Nida
A. F. Terry
INVENTOR:
Jason P. Lord
Francis E. Lord
BY Orvin E. Lord
ATTORNEYS.
THE GRAPHIC CO. PHOTO-LITH. 39 & 41 PARK PLACE, N.Y.

UNITED STATES PATENT OFFICE.

JASON P. LORD, FRANCIS E. LORD, AND ORRIN E. LORD, OF READSBOROUGH, VERMONT.

IMPROVEMENT IN MOWING-MACHINES.

Specification forming part of Letters Patent No. 161,136, dated March 23, 1875; application filed December 12, 1874.

*To all whom it may concern:*

Be it known that we, JASON P. LORD, FRANCIS E. LORD, and ORRIN E. LORD, of Readsborough, in the county of Bennington and State of Vermont, have invented a new and useful Improvement in Mowing-Machines, of which the following is a specification:

Figure 1 is a top view of our improved machine, parts being broken away to show the construction. Fig. 2 is a vertical section of the same, taken through the line $x\,x$, Fig. 1. Fig. 3 is a detail top view of one of the guards. Fig. 4 is a detail section of one of the wheels, taken through the line $y\,y$, Fig. 1.

Similar letters of reference indicate corresponding parts.

Our invention has for its object to furnish an improved mowing-machine, which shall be so constructed as to greatly diminish the friction in operating it, which shall have no side draft, and which will allow the cutters to be taken off one at a time to be ground, or to be replaced with new ones when broken.

The invention consists in the loose outer rims, provided with the central rib and the ratchet-teeth, the spring-pawls, and the grooved friction-wheels, in combination with the rims of the wheels, rigidly attached to the axle of the mover; in the combination of the hinged pawl, the stationary pawl, and the U-slide with the notched edges of the rim of the wheel, with the forked bar that carries the cutter-bar, and with the connecting-rod that operates the sliding bar and vibrates the cutters; and in the three-armed lever, in combination with the forked bar that carries the cutter-bar, as hereinafter fully described.

A is the driver's seat, the standard of which is attached to the rear end of the tongue B. The rear part of the tongue B is rigidly attached to the frame or body plate C of the machine, the rear end of which rides upon the axle D. To the ends of the axle D are rigidly attached wheels F, so that the said wheels may carry the said axle with them in their revolution. The rim of one of the wheels E is notched upon its edges, the salient angles of the one edge being opposite the re-entrant angles of the other edge, as shown in Figs. 1 and 4. The wheels E are surrounded with loose rims E, the outer surfaces of which have teeth or corrugations formed upon them to prevent them from slipping upon the ground. The rims F have each a rib, $f^1$, formed upon the middle part of their inner surfaces, to serve as a track for the small grooved friction-wheels G to roll upon. The friction-wheels G are pivoted to lugs or flanges formed upon the inner surfaces of the rims of the wheels E, the friction-wheels G projecting through slots in the said rims, as shown in Figs. 1, 2, and 4. In slots in the rims of the wheels E are also pivoted pawls H, the engaging ends of which take hold of ratchet-teeth $f^2$, formed upon the inner surface of the rims F, so that the said rims F may carry the wheels E with them in their revolution. The pawls H are held out against the ratchet-teeth $f^2$ by small springs I, as shown in Fig. 2. T is the cutter-bar, the ends of which are bolted to the forward ends of the bars K L. The bar K is made with an offset, as shown in Fig. 1, so that its rear end may pass back along the inner side of the wheel E F, and be pivoted to the axle D at the inner end of the hub of the said wheel. The rear part of the other bar L is forked or slotted, and its arms or branches pass back upon the opposite sides of the wheel E F, and are pivoted to the axle D at the outer and inner ends of the hub of the said wheel. In a transverse dovetailed or T groove in the bar L, at the base of its slot, is placed a U-slide, M, the arms of which project across the opposite edges of the forward parts of the rims of the wheel E F. To the outer arm of the slide M, directly opposite the notched outer edge of the rim of the wheel E, is secured a stationary pawl, N, the edge of which bears against the said notched edge. To the inner arm of the slide M, directly opposite the inner notched edge of the wheel E, is hinged a pawl, O, which, when turned down, rests against the said notched edge, and which, when not in use, may be turned back out of contact with said rim. The hinged pawl O is provided with a lever or handle, $o'$, for convenience in operating it to throw it into and out of gear with the rim of the wheel E.

By this construction, when the pawl O is turned down, and the machine is drawn forward, the notched rim of the wheel E will give a rapid vibratory movement to the slide M.

P is a connecting-bar, which is pivoted to the outer arm of the slide M, and the rear end of which is pivoted to the rear part of the outer arm of the bar L. The forward end of the connecting-bar P is pivoted to the end of a bar, Q, which slides longitudinally in dovetailed or T notches in the upper sides of the guards or fingers R, along the forward edge of the cutter-bar J. The upper rear part of the guards R are rabbeted to receive the cutter-bar J, the shoulder of said rabbet being inclined, to fit into beveled notches in the forward edge of the cutter-bar J, so that the said guards R may each be secured in place by a single bolt passing through the said cutter, and into or through the rear ends of the said guards. The guards R are further strengthened in position by lugs or projections formed upon their sides, and which abut against each other. S are the cutters, which are made in the general shape shown in Fig. 1, and the rear ends of which are notched to receive the bodies of the headed pins T, permanently attached to the rear part of the cutter-bar J. The forward parts of the cutters S are slotted longitudinally to receive the bodies of the headed pins U, permanently attached to the sliding bar Q, so that the said cutters S may be vibrated by the movements of the said bar Q. The forward ends of the slots in the cutters S are enlarged, as shown in Fig. 1, so that, by moving the bar Q through the space of two guards, the cutters S may be detached one by one, for grinding or any other desired purpose. V is a chain, the lower end of which is attached to the forward part of the bar L, and which is hooked upon a pin or hook attached to the forward part of the body or frame C, to support the cutter-bar J at any desired distance above the ground. W is a three-armed lever, the end of the lower arm of which is attached to the forward part of the bar L, and the end of its rear arm is attached to the rear end of said bar L. The upper arm of the lever W projects into such a position that it may be conveniently reached and operated by the driver, to raise the cutter-bar J away from the ground for convenience in passing obstructions, and in passing from place to place. X is a catch, which is pivoted to the side of the tongue A, and upon the forward side of the lower end of which is formed a notch, to catch upon the rear edge of the cutter-bar J and support said cutter-bar away from the ground. The forward side of the lower end of the catch X is beveled off, as shown in Fig. 2, so that when the cutter-bar J is raised by the lever W the rear edge of the said cutter-bar may push back the catch X, and catch upon it automatically.

Having thus described our invention, we claim as new and desire to secure by Letters Patent—

1. The loose outer rims F, provided with the central rib $f^1$ and the ratchet-teeth $f^2$, the spring-pawls H I, and the grooved friction-wheels G, in combination with the rims of the wheels E, rigidly attached to the axle of the mower, substantially as herein shown and described.

2. The combination of the hinged pawl O, the stationary pawl N, and the U-slide M with the notched edges of the rim of the wheel E, with the forked bar L, that carries the cutter-bar J, and with the connecting-rod P, that operates the sliding bar Q and vibrates the cutters, substantially as herein shown and described.

3. The three-armed lever W, in combination with the forked bar L, that carries the cutter-bar J, substantially as herein shown and described.

JASON P. LORD.
FRANCIS E. LORD.
ORRIN E. LORD.

Witnesses:
W. W. FOLLETT,
LEROY N. STEVENS.